United States Patent
Choiniere

(10) Patent No.: US 10,267,900 B2
(45) Date of Patent: Apr. 23, 2019

(54) SYSTEM AND METHOD FOR COVERT POINTER/COMMUNICATIONS AND LASER RANGE FINDER

(71) Applicant: BAE SYSTEMS INFORMATION AND ELECTRONIC SYSTEMS INTEGRATION INC., Nashua, NH (US)

(72) Inventor: Michael J. Choiniere, Merrimack, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 339 days.

(21) Appl. No.: 15/344,849

(22) Filed: Nov. 7, 2016

(65) Prior Publication Data

US 2018/0128906 A1    May 10, 2018

(51) Int. Cl.
| | |
|---|---|
| G01S 7/48 | (2006.01) |
| G01S 7/486 | (2006.01) |
| G01S 7/51 | (2006.01) |
| G01S 17/10 | (2006.01) |
| G01S 7/481 | (2006.01) |
| G01S 7/484 | (2006.01) |

(52) U.S. Cl.
CPC ........... *G01S 7/4861* (2013.01); *G01S 7/484* (2013.01); *G01S 7/4814* (2013.01); *G01S 7/51* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 5,555,662 | A | 9/1996 | Teetzel |
| 5,583,688 | A | 12/1996 | Hornbeck |
| 6,839,127 | B1 | 1/2005 | Anderson |
| 8,210,044 | B1 | 7/2012 | Maleki et al. |
| 2005/0057741 | A1 | 3/2005 | Anderson et al. |
| 2014/0240721 | A1 | 8/2014 | Herschbach |
| 2016/0003945 | A1 | 1/2016 | Setono et al. |

FOREIGN PATENT DOCUMENTS

| | | |
|---|---|---|
| CN | 102520412 A | 6/2012 |
| JP | 2016014607 A | 1/2016 |
| WO | 2004/036246 A1 | 4/2004 |
| WO | 2016/005893 A1 | 1/2016 |
| WO | 2016/092451 A1 | 6/2016 |

OTHER PUBLICATIONS

International Searching Authority, Written Opinion of the International Searching Authority, 7 pages, dated Feb. 1, 2018.

*Primary Examiner* — Hovhannes Baghdasaryan
(74) *Attorney, Agent, or Firm* — Davis & Bujold, PLLC

(57) ABSTRACT

A system and method for covert targeting and communication that uses Laser Range Finder (LRF) and Digital Light Processing (DLP) technology. By modulating the pulses of the laser in a LRF according to a predetermined library and by using a "divide-by-two" shutter pattern scheme applied to the DLP mirror's field of view, a covert communication and targeting system can be utilized in the field as part of a lightweight, low cost system.

17 Claims, 5 Drawing Sheets

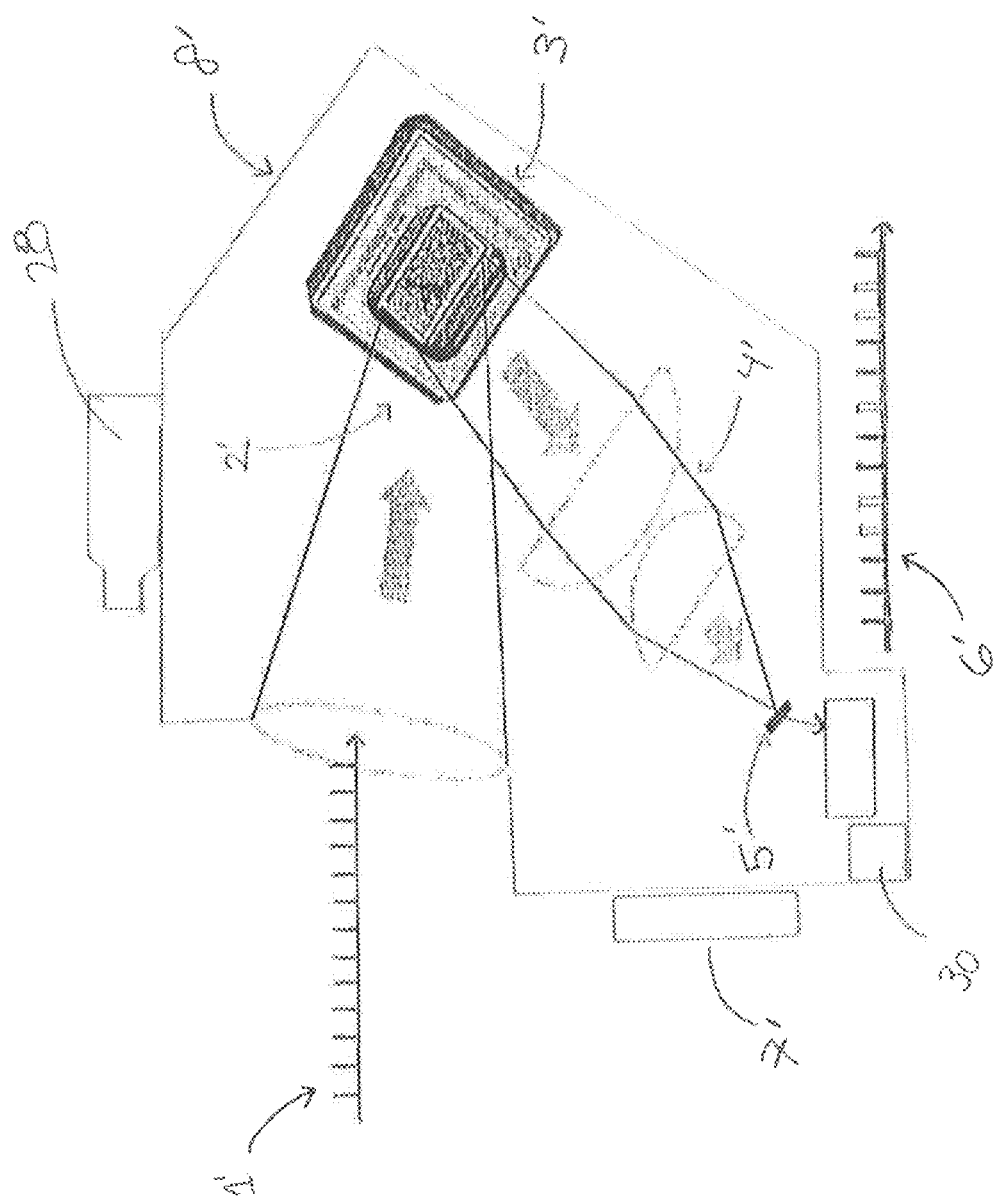

SYSTEM AND METHOD FOR COVERT POINTER/COMMUNICATIONS AND LASER RANGE FINDER

FIELD OF THE DISCLOSURE

The present disclosure relates to laser range finders and, more particularly, to using laser range finders as part of a small, covert pointer/communications system.

BACKGROUND OF THE DISCLOSURE

Laser range finders are devices that use a laser beam to determine the distance from the laser device to another object. Generally, laser range finders determine distances by measuring the time it takes a laser pulse to be reflected off an object and detected by the sender's imager. A laser range finder (LRF) can be very precise, to within a few millimeters, depending on the sharpness of the laser's pulses and the speed of the detector used to receive the reflected pulses. A LRF can have distance ranges that vary depending on the divergence in the laser beam, atmospheric conditions (e.g. moisture, trees, and other obstructions), and even temperature distortions along the horizon. Generally, a LRF is capable of determining the distance from an object up to about 400 meters away. In military applications though, handheld LRFs operate at ranges of 2-25 km and are often combined with binoculars or monocular devices. Vehicle mounted military LRFs operate in the 25 km range.

In tactical operations it is not only important to know precisely where a target is located, but it is important to be able to communicate that information to others. Additionally, it is important to detect a target and communicate the detection of that target without the target's knowledge. The present disclosure relates to and provides a system for such an application.

SUMMARY OF THE DISCLOSURE

One aspect of the present disclosure is a system for covert targeting, comprising a housing configured to surround a receiver comprising a DLP mirror for detecting a series of laser pulses reflected off a target of interest; a shutter for modulating the field of view of the Digital Light Processing (DLP) mirror system; a processor for determining, via a single element detector, if a pulse in the series of laser pulses was detected on each of a series of modulated fields of view of the DLP mirror to determine the location of the target of interest; and a display for presenting location information for the target of interest to an operator.

One embodiment of the system for covert targeting is wherein the shutter modulates the field of view of the DLP mirror using a "divide-by-two" scheme. In some cases, the display is remote from the processor.

Another embodiment of the system for covert targeting further comprises a pulsed laser source having a modulator for producing a series of laser pulses.

Another aspect of the present disclosure is a system for covert communication, comprising a pulsed laser source having a modulator for producing a series of laser pulses; and a receiver, comprising a DLP mirror for detecting a series of laser pulses reflected off a target of interest; a shutter for modulating the field of view of the DLP mirror; and a processor for determining, via a single element detector, if a pulse in the series of laser pulses was detected on each of a series of modulated fields of view of the DLP mirror to determine the location of the target of interest; and a display for presenting location information for the target of interest to an operator.

One embodiment of the system for covert communications is wherein the shutter modulates the field of view of the DLP mirror using a "divide-by-two" scheme. In some cases, the display is remote from the processor.

Yet another aspect of the present disclosure is a method of covert communication, comprising providing to a first operator a first pulsed laser source having a modulator for producing a first series of laser pulses; providing to a second operator a receiver, comprising, a DLP mirror for detecting the first series of laser pulses reflected off a target of interest; a shutter for modulating the field of view of the DLP mirror; and a processor for determining, via a single element detector, if a pulse in the series of first laser pulses was detected on each of a series of modulated fields of view of the DLP mirror; determining, with the processor, the location of the target of interest by comparing pulses that were detected in a first modulated field of view with pulses that were not detected in a different modulated field of view; presenting to the second operator, on a display, location information for the target of interest; and tagging by the first operator the target of interest by sending a first modulated series of laser pulses to the target.

One embodiment of the method of covert communication further comprises providing to the second operator a second pulsed laser source having a modulator for producing a second series of laser pulses. Another embodiment of the method of covert communication further comprises sending by the second operator a second modulated series of laser pulses to the first operator.

In another embodiment of the method of covert communication, the shutter modulates the field of view of the DLP mirror using a "divide-by-two" scheme. In some cases, the display is remote from the processor.

In yet another embodiment of the method of covert communication, the modulated series of laser pulses are created by modifying the pulse repetition interval (PRI) of a laser source in a pre-determined way.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 6 shows a diagrammatic view of another embodiment of the LRF/receiver of the system of the present disclosure.

DETAILED DESCRIPTION OF THE DISCLOSURE

It has been recognized that laser range finders (LRF) can detect the location of a target with precision over long distances. However, in tactical situations it is important to be able to detect a target's location without the target's knowledge. Furthermore, the ability to covertly communicate a target's position to others is also critical to keeping personnel and equipment out of harm's way. The ability to covertly communicate information relating to the target also facilitates effective engagement with a target should that become necessary.

Figure 1:
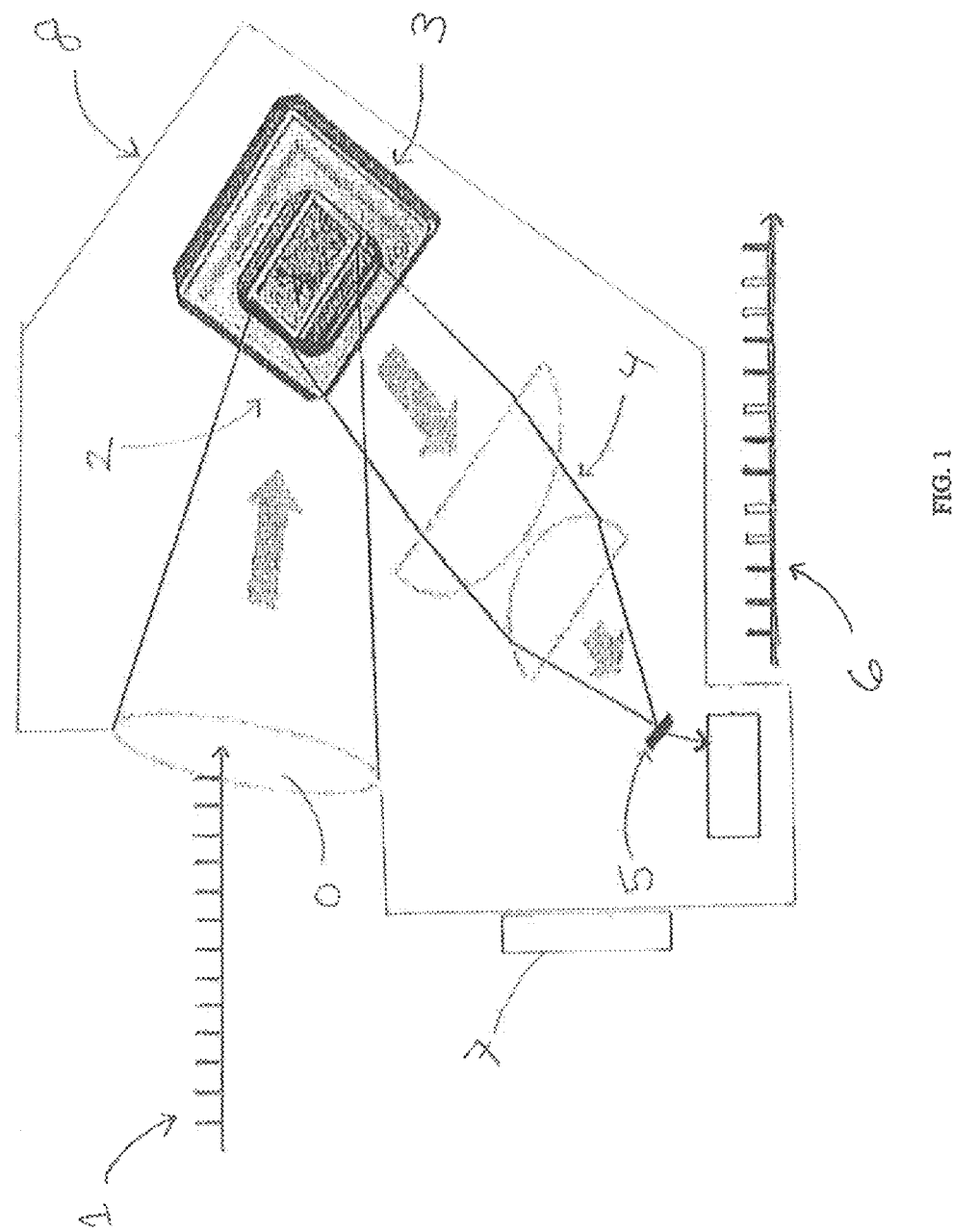
FIG. 1 shows a diagrammatic view of one embodiment of the receiver of the system of the present disclosure.

Referring to FIG. 1, one embodiment of the receiver of the covert pointer/communications system of the present disclosure is shown. More particularly, a pulsed signal 1 is sent from a first LRF (not shown). The LRF pulsed signal 1 is received by an object lens O and imaged on the DLP mirror 2 where each pixel(s) represents an angular location in the field of view (FOV) of the receiver. The imaged return signal is reflected off the DLP mirror and is modulated by a "shutter" pattern 3 where the reflected light is collected by the condenser 4 to a single element detector, or avalanche photodiode (APD) 5. By using a series of shutter patterns and a pulse train (e.g., 5 to 10 pulses) the DLP digitizes the angular location of the signal return to a specific pixel or group of pixels (depending on the resolution) within the DLP array. That specific pixel or group of pixels directly corresponds to the angular location of the return signal or target reflection within the DLP's FOV. The pulse data is then processed, as generally indicated by reference numeral 6, to determine the location of the pulsed signal from the first LRF within the FOV of the scanning DLP system. As shown diagrammatically in FIG. 1, a covert receiver, according to the principles of the present disclosure, comprises a DLP mirror 2 applying a shutter pattern 3, a condenser 4, a single element detector 5, and a display 7, which are all encased and enclosed within an exterior housing 8. In another embodiment, the covert receiver includes a transceiver for communicating the display information to one or more remote displays. In the latter embodiment, the integrated display is optional.

Still referring to FIG. 1, the detected pulsed set 6 shows the first three pulses were detected, the next two were "missing", i.e., not detected, the following two pulses were detected, the next pulse was "missing", the following two pulses were detected, the next two pulses were "missing" and the last pulse was detected. The method of modulation of the light detected by the DLP mirror will be discussed in more detail below.

It is understood that it is important to be able to determine, with precision, where a target is located within the FOV. To do so, pulsed lasers are often used. In one embodiment of the present disclosure, the laser on the LRF emits a set of pulses over a very short period of time. For example, the laser emits a 13 pulse burst at about 5 kHz within a time period of about 2.6 ms. The laser pulses are then reflected off a target and the reflected pules are referred to as an "echo." In certain embodiments of the system of the present disclosure, the receiver of the "echo" can processes near-infrared (near-IR) and short-wavelength infrared (SWIR) wavelengths. In some cases, the wavelength used is about 1.5 μm. In other cases, the receiver is useful over a broader range of wavelengths.

According to the principles of the present disclosure, the receiver detects the first pulse in the laser's pulsed set and then utilizes digital light processing (DLP) to scan for the position of the target's echo. A DLP mirror is a form of digital micromirror device (DMD). A DMD) is a chip that has several hundred thousand microscopic mirrors provided on its surface and arranged in an array which corresponds to pixels. Each of the individual mirrors can be rotated into either an "on" or "off" state. In the "on" state, light from a light source is reflected in the direction of a detector 5 and the pixel appears to be bright. In the "off" state, the light is directed elsewhere, e.g., to a light trap for example, making the pixel appear to be dark.

Typically, DLP mirrors are designed for visible and near IR uses. In some cases, the DLP mirror has a transmissive window configured for the working band. With the application of the proper antireflection coatings to the window the DLP mirror can be used with SWIR, MWIR, LWIR, and the like. As referred to herein, visible light ranges from about 400 nm to about 700 nm and infrared (IR) ranges from about 700 nm to about 1 mm. The IR range is further subdivided in to near-IR (about 0.75-1.4 μm), short-wavelength IR or SWIR (about 1.4-3 μm), mid-wavelength IR, or MWIR (about 3-8 Mm), long-wavelength IR, or LWIR (8-15 μm), and far-IR (about 15 μm-1 mm).

In certain applications, by invoking varying scanning or shutter patterns on the DLP mirror, both the direction and the energy distribution of the laser can be measured. In one example, the measurement can be done by turning one pixel "on" at a time while all of the other pixels "off." In another example, the measurement can be done by using a spatial pattern of a limiting aperture generated by the DLP. For example, the limiting aperture could be formed by turning on a group of pixels in circular format. Additionally, the DLP can scan (e.g., turn "on" and "off") by rows and columns, to locate the peak LRF pulse energy (centroid) in DLP pixel space.

In one embodiment of the system of the present disclosure, the light measured by the DLP mirror is modulated by a shutter pattern that is synchronized to the pulsed signal from the first LRF. This shutter pattern obscures a portion of the field of view by a "divide-by-two" scan; e.g., half of the pixels are turned "on," and the other half of the pixels are turned "off," to rapidly identify the location of the target. An analogous "divide-by-two" scan is disclosed in another application by Applicant, U.S. Ser. No. 15/154,378, the disclosure and contents of which are incorporated herein by reference in their entirety.

Figure 2:
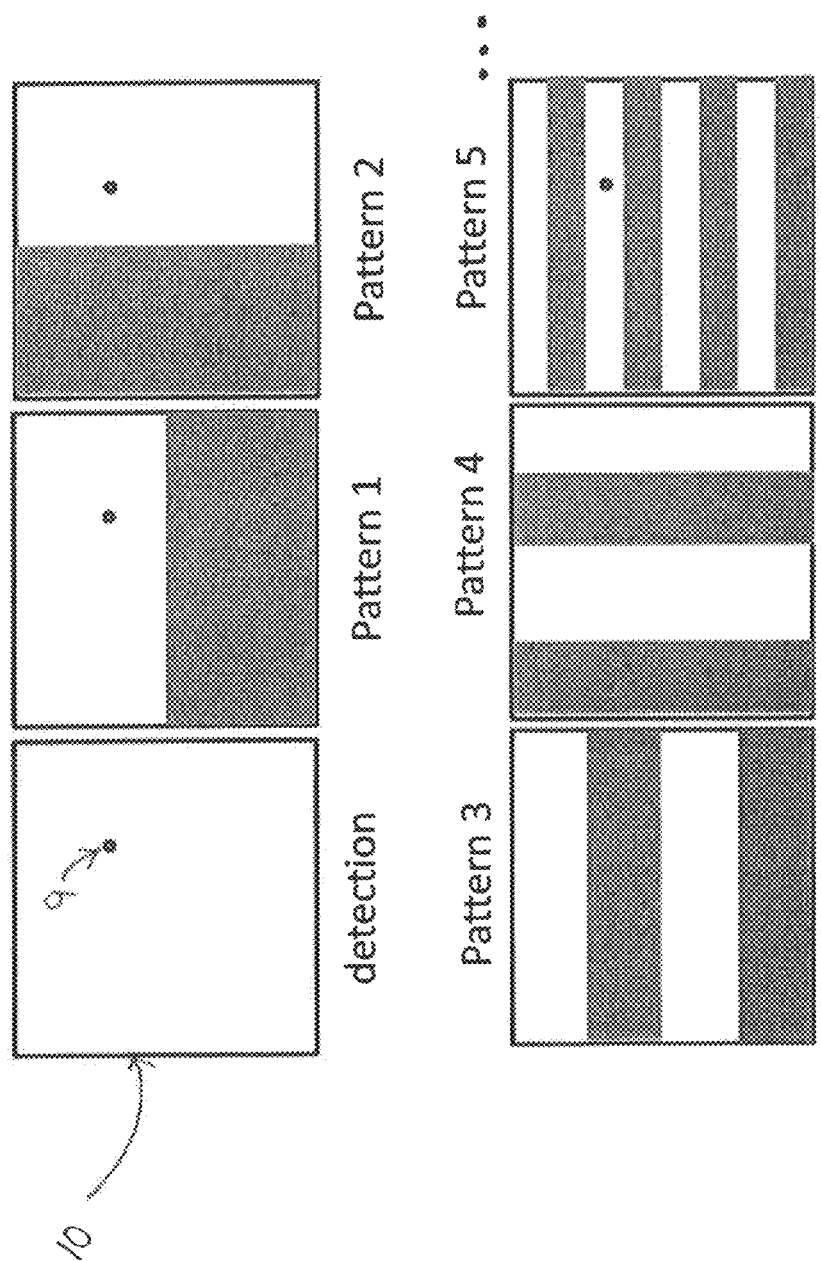
FIG. 2 shows a series of exemplary shutter positions used in an embodiment of the system of the present disclosure.

Referring to FIG. 2, the detected pulse is shown as a dot 9 (representing the target) within the DLP mirror's FOV 10. As shown in FIG. 2, a first pulse in a set is detected without the use of the shutter pattern (e.g., turning some of the micromirrors to an "off" position). The second pulse coincides with application of the shutter pattern to the bottom half of the DLP mirror's FOV (e.g., Pattern 1 in FIG. 2). The third pulse coincides with application of the shutter pattern to one side of the DLP mirror's FOV (e.g., Pattern 2 in FIG.

2). The fourth pulse coincides with Pattern 3 in FIG. 3, and so on. It is understood that the specific shutter patterns and the order of application of the patterns may vary and still be captured by the principles of the present disclosure. By methodically applying the series of "divide-by-two" patterns onto the DLP FOV, a precise location of the target can be determined very rapidly.

The system of the present disclosure is small, compact, lightweight and low cost as there is no need for a SWIR, or similar camera, to detect and process the pulses sent from a LRF. The system as described herein makes both covert pointing and covert communication possible using a LRF operated by one user and a receiver operated by an independent and distinct second user. Depending on the laser used as the LRF, the wavelengths chosen can be from a group that is not often used in the field so as to provide covert communication between the first and the second user. The pulse repetition interval (PRI) of the laser can be modified "on the fly" to allow communication between like users on a battle field. For example, a pulsed set with a particular pause between specific pulses might indicate a first message, where another different sequence may indicate a second message, and so on. A preprogrammed library of messages would be unique to a set of users so that even if the laser signals were to be intercepted the significance would not be apparent.

Figure 3:
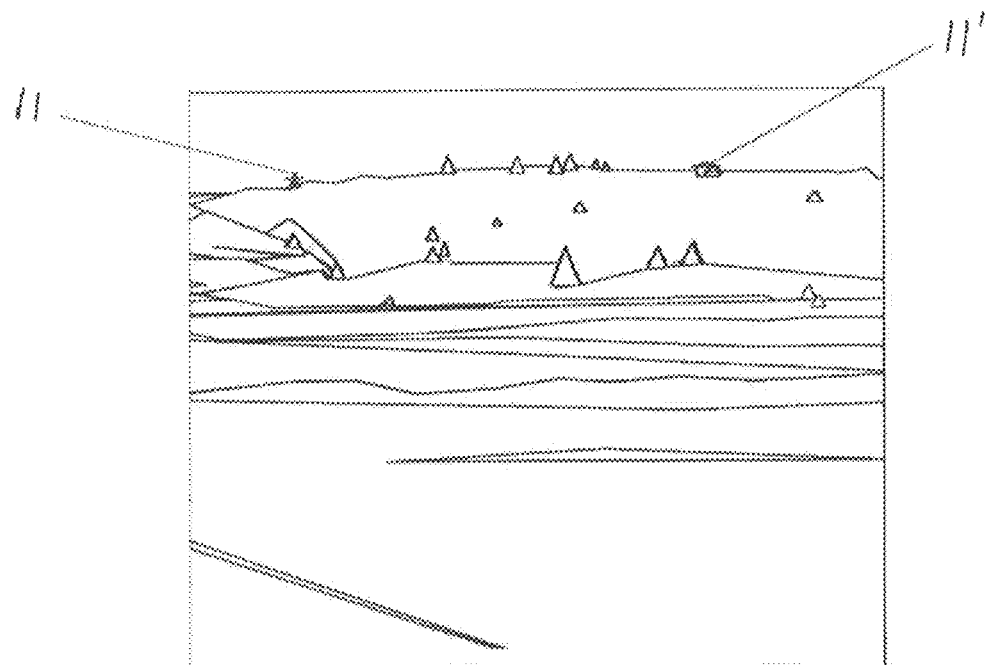
FIG. 3 is a diagrammatic illustration showing a scene being viewed by a receiver, according to the present disclosure, with multiple targets located within the scene.

As shown in FIG. 3, a diagrammatic illustration shows a scene being viewed by a receiver, according to the principles of the present disclosure, with multiple targets located within the scene. There, a first target 11 has been marked as a "friend" by an LRF according to the principles of the present disclosure while a second target 11' has been marked as a "foe." The system of the present disclosure provides at least two users, remote from each other, with the ability to communicate covertly about a scene, e.g., to indicate the "friend" from the "foe." The communication might include target identifying information, instructions, or simple messages relating to the quality of the signals or the status of the user.

In certain embodiments, the a user is looking at a section of terrain through a viewer and overlaid on that view is a light or other indication that identifies the location of a target of interest. In some embodiments, the color of the light might correspond to target information such as "friend" or "foe." In other examples, the color might represent commands such as "engage" or "hold." In yet other examples, a particular symbology unique to a particular group of users might be used to convey information sent via the modulated laser pulses.

Figure 4:
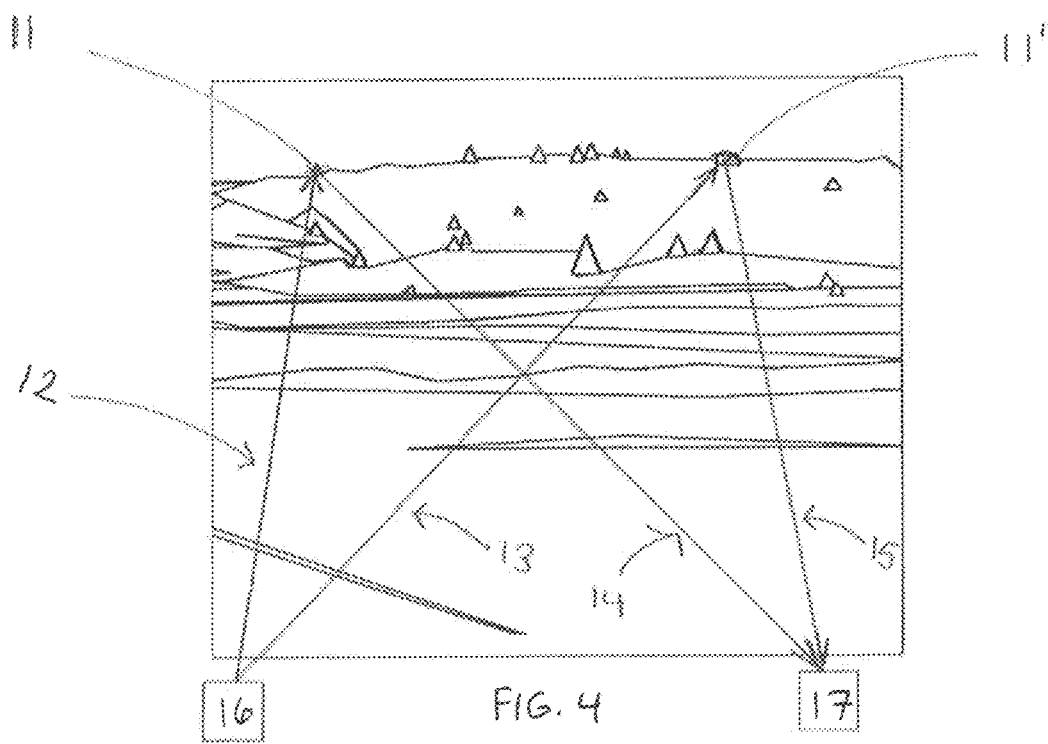
FIG. 4 is a diagrammatic illustration showing a scene being tagged by a LRF and read by a receiver, according to the present disclosure, with multiple tagged targets located within the scene.

As shown in FIG. 4, a diagrammatic illustration of a scene being tagged by a LRF 16 and read by a receiver 17, according to the principles of present disclosure, with multiple tagged targets located within the scene is shown. That is, the first device 16 sends a first pulsed laser set 12 to a first target 11 and a second pulsed laser set 13 to a second target 11'. A second device 17 receives a first target's location information and/or a message 14, from the first target 11, and a second target's location information and/or a message 15, from the second target 11'. In some embodiments of the system of the present disclosure the first device is a simple LRF capable of modifying the pulse repetition interval (PRI) to code a target as "friend" or "foe," or send other predetermined messages. In certain embodiments, the second device is a receiver for receiving modulated LRF signals.

In one example, a first laser, e.g., LRF, 16 can be pointed at a target and a second receiver (e.g., a second operator in a different location operating receiver 17) can detect the pulses sent by the first laser. By decoding the PRI, a message can be received by the second operator. In one instance, a message of "got it" might be returned to the source of the original laser point on target. Another example might be a message of "bad signal," or "engage," or the like. In other embodiments, a message of 'friend" or "foe" might be used to mark a target so that other operators can assess a scene. It is understood that a series of predetermined modulated waveforms could be used for covert communication between two or more users that are not in proximity or even within line of sight of each other, but rather are communicating with one another via the echo off a target. In all cases, the use of the shutter patterns on the DLP FOV, as described herein, can determine accurately where a target of interest is located with respect to each user and the type of target, e.g., "friend," "foe," etc.

Figure 5:
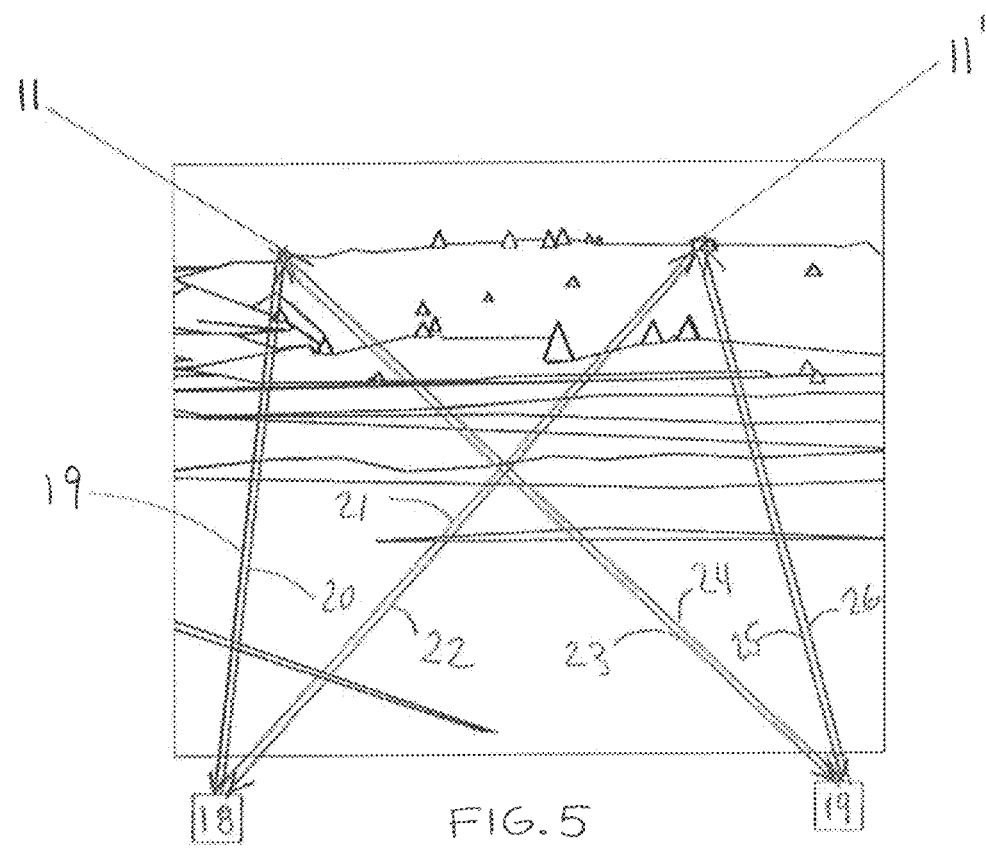
FIG. 5 is a diagrammatic illustration showing a scene where communication is occurring between a first LRF/receiver and a second LRF/receiver, according to the present disclosure, with multiple tagged targets located within the scene.

Referring to FIG. 5, a diagrammatic illustration of a scene where communication is occurring between a first LRF/receiver and a second LRF/receiver, according to the present disclosure, with multiple tagged targets located within the scene, is shown. More particularly, the LRF/receiver devices 18 and 19 are located spaced apart from each other and are sending and receiving communications through modulated laser pulses as described herein. A first target 11 has been marked as "friend" and a second target has been marked as "foe" as in the previous example. The first device (LRF/receiver) 18 has tagged 11 and 11' with signals 20 and 21 and receives responses from the second device 19 (LRF/receiver) off the same targets via signals 19 and 22. Likewise, the second device 19 receives target location and other information from the first device 18 via signals 23 and 25 and sends responses, or other messages to the first device 18 via signals 26 and 24.

It is understood that in some embodiments, one or both of the devices comprise a receiver for receiving signals from other LRF devices that have tagged a target with information or that are privy to the predetermined messages/symbology used to communicate a variety of information. In other embodiments, one or both of the devices comprises a LRF capable of modifying the pulse repetition interval (PRI) to code a target as "friend" or "foe," or send other predetermined messages.

Turning now to FIG. 6, a diagrammatic view of another embodiment of the LRF/receiver of the system of the present disclosure is shown. More particularly, a pulsed signal 1' is sent from a first LRF (not shown). The pulsed signal 1' is received by an object lens and imaged on the DLP mirrors 2' where each pixel(s) represents an angular location in the field of view (FOV) of the receiver. The imaged return signal is reflected off the DLP mirror and is modulated by a shutter pattern 3' where the reflected light is collected by the condenser 4' to a single element detector, or avalanche photodiode (APD) 5'. By using a series of shutter patterns and a pulse train (e.g., 5 to 10 pulses) the DLP digitizes the angular location of the signal return to a specific pixel or group of pixels (depending on the resolution) within the DLP mirror array. That specific pixel or group of pixels directly corresponds to the angular location of the return signal or target reflection within the DLP's FOV. The pulse data is then processed, as generally indicated by reference numeral 6', to determine the location of the pulsed signal from the first LRF within the FOV of the scanning DLP mirror.

As shown diagrammatically in FIG. 6, an LRF/receiver, according to the principles of the present disclosure, comprises a DLP mirror 2' applying a shutter pattern 3', a condenser 4', a single element detector 5', and a display 7', which are all encased and enclosed within an exterior housing 8'. Additionally, a LRF 28 is present and is used to return/send modulated pulsed laser signals to other receivers as described herein. In some embodiments, a transceiver 30 is also present and is used to communicate with other operators both on and off the field via wireless technology. In some cases, the portion of terrain with the overlain target location and other information may be transmitted to others located remotely. In other cases, bearing, range, and other information may be transmitted to other users.

Generally, the laser beam of a LRF has some amount of divergence. In some cases, that divergence may be about 6° or so. In some situations, according to the principles of the present disclosure, the LRF may be located on a weapon or hand pointed by an operator. In some cases, the laser in the LRF is a 100 µJ laser, 1.5 µm (eye safety) 5 KHz laser, providing a 13 pulse burst mode during the LRF mode while providing a continuous stream of pulse in the communication mode of varying PRI codes.

In one example of the present system, a 6×6 degree window is assumed for the DLP array. By using the "divide-by-two" methodology over a series of 12 pulses, $2^{12}$ yields a 4,096 reduction or 0.09 degree bins or +/−0.045 degree accuracy. Preprogram binary mirror patterns are implemented after confirmation of the first pulse return with the mirror completely in the "on" position. As the second pulse leaves the system the new mirror pattern is already initiated to spatially modulate the next pulse return. This is repeated until all pulses are processed. With a laser rate of about 1 kHz, a scan can be completed in about 0.012 seconds. In certain embodiments, all returns can be scanned simultaneously within the 0.012 seconds using temporal and spatial filtering.

In certain embodiments, the DLP is a ⅓ WVGA (wide video graphics array) with a 7.6 µm pitch, 608×684 array, windowed to 320×256. In some cases, the DLP has a scan rate over 4 kHz and uses about 0.1 watt of power. In certain embodiments, the system can determine range, bearing, and target coordinates using self-location. Bearing and range changes can be focused on as GPS indicates movement in the target. A revisit rate of about every second can be used with little to no power consumption.

There is a very large signal-to-noise ratio (SNR) in the system of the present disclosure as the LRF is augmented with a DLP mirror array. The system is low cost, in part, because there is no need for a SWIR, or similar, camera. The system can be used for covertly targeting and for limited covert communications. The system is lightweight and inexpensive and can be incorporated into existing systems, including weapons, hand held targeting systems, and night vision goggles where the results are overlaid onto the display. In other instances, the target location information may be transmitted to an operator remote from the receiver.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for covert targeting, comprising
   a housing configured to surround a receiver comprising
      a digital light processing (DLP) mirror array for redirecting a series of laser pulses reflected off a target of interest, wherein the DLP mirror array applies shutter patterns to create a series of modulated fields of view of the DLP mirror array; and
      a processor for determining, via a single element detector, if a pulse in the series of laser pulses was detected on each of the series of modulated fields of view of the DLP mirror array to determine the location of the target of interest; and
   a display for presenting location information for the target of interest to an operator.

2. The system for covert targeting of claim 1, wherein the shutter patterns modulate the field of view of the DLP mirror array using a "divide-by-two" scheme.

3. The system for covert targeting of claim 1, wherein the display is remote from the processor.

4. The system for covert targeting of claim 1, further comprising a pulsed laser source having a modulator for producing the series of laser pulses.

5. The system for covert targeting of claim 1, further comprising a transceiver for communicating wirelessly.

6. The system for covert targeting of claim 4, wherein the transceiver transmits location information for the target of interest.

7. A system for covert communication, comprising
   a pulsed laser source having a modulator for producing a series of laser pulses, wherein said series of laser pulses are directed toward a target of interest; and
   a receiver, comprising
      a DLP mirror array for redirecting a series of laser pulses reflected off the target of interest, wherein the DLP mirror array applies shutter patterns to create a series of modulated fields of view of the DLP mirror array; and
      a processor for determining, via a single element detector, if a pulse in the series of laser pulses was detected on each of the series of modulated fields of view of the DLP mirror array to determine the location of the target of interest; and
   a display for presenting location information for the target of interest to an operator.

8. The system for covert communication of claim 7, wherein the shutter patterns modulate the field of view of the DLP mirror array using a "divide-by-two" scheme.

9. The system for covert communication of claim 7, wherein the display is remote from the processor.

10. The system for covert communication of claim 7, further comprising a transceiver for communicating wirelessly.

11. A method of covert communication, comprising
    providing to a first operator a first pulsed laser source having a modulator for producing a first series of laser pulses;
    providing to a second operator a receiver, comprising,
       a DLP mirror array for redirecting the first series of laser pulses reflected off a target of interest, wherein the DLP mirror array applies shutter patterns to create a series of modulated fields of view of the DLP mirror array; and
       a processor for determining, via a single element detector, if a pulse in the series of first laser pulses was detected on each of the series of modulated fields of view of the DLP mirror array;
    determining, with the processor, the location of the target of interest by comparing pulses that were detected in a first modulated field of view with pulses that were not detected in a different modulated field of view;

presenting to the second operator, on a display, location information for the target of interest; and tagging by the first operator the target of interest by sending a first modulated series of laser pulses to the target.

12. The method of covert communication of claim 11, further comprising providing to the second operator a second pulsed laser source having a modulator for producing a second series of laser pulses.

13. The method of covert communication of claim 11, further comprising sending by the second operator a second modulated series of laser pulses to the first operator.

14. The method of covert communication of claim 11, wherein the shutter patterns modulate the field of view of the DLP mirror array using a "divide-by-two" scheme.

15. The method of covert communication of claim 11, wherein the display is remote from the processor.

16. The method of covert communication of claim 11, wherein the modulated series of laser pulses are created by modifying the pulse repetition interval (PRI) of a laser source in a pre-determined way.

17. The method for covert communication of claim 1, further comprising a transceiver for communicating wirelessly.

* * * * *